United States Patent [19]
Pito

[11] Patent Number: 5,831,621
[45] Date of Patent: *Nov. 3, 1998

[54] POSITIONAL SPACE SOLUTION TO THE NEXT BEST VIEW PROBLEM

[75] Inventor: Richard A. Pito, Boston, Mass.

[73] Assignee: The Trustees of the University of Pennyslvania, Philadelphia, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 734,363

[22] Filed: Oct. 21, 1996

[51] Int. Cl.$^6$ .................................................... G06F 15/00
[52] U.S. Cl. ........................................... 345/419; 364/560
[58] Field of Search .......................... 364/525; 345/427, 345/419; 395/127; 362/312

[56] References Cited

U.S. PATENT DOCUMENTS

| | | | |
|---|---|---|---|
| 4,635,203 | 1/1987 | Merchant | 364/458 |
| 4,687,325 | 8/1987 | Corby, Jr. | 356/1 |
| 4,687,326 | 8/1987 | Corby, Jr. | 356/5 |
| 4,695,959 | 9/1987 | Lees et al. | 364/458 |
| 4,900,146 | 2/1990 | Penney et al. | 356/1 |
| 5,003,166 | 3/1991 | Girod | 250/201.4 |
| 5,319,443 | 6/1994 | Watanabe et al. | 356/375 |
| 5,471,541 | 11/1995 | Burtnyk et al. | 382/153 |

OTHER PUBLICATIONS

Banta, et al., A "best–next–view" algorithm for three–dimensional scene reconstruction using range images, *Intel. Robotics and Comp. Vision XIV session of Intel. Sys. and Advanced Manufcturing Symp. SPIE.*, 1995.

Besl, et al., A Method for Registration of 3–D Shapes, *IEEE Transactions of Pattern Analysis and Machine Intelligence*, vol. 14, No. 2, Feb. 1992, pp. 239–256.

Connolly, The Determination of Next Best Views, 1985, *IEEE Int. Conf. on Robotics and Automation*, 1985, pp. 432–435.

Curless et al., A Volumetric Method for Building Complex Models from Range Imges, *Computer Graphics Proceedings, Annual Conference Series, SIGGRAPH*, Aug. 1996, pp. 1–10.

Hutchinson, et al., Planning Sensing Strategies in a Robot Work Cell with Multi–Sensor Capabilities, *IEEE Transactions on Robotics and Automation*, vol. 5, No. 6, Dec. 1989, pp. 765–783.

Kamgar–Parsi, et al., Registrationof Multiple Overlapping Range Images: Scenese without Distinctive Features, *IEEE-Comp. Vision Pattern Recogn. Conf., San Diego, CA*, Jun. 1989, pp. 282–290.

(List continued on next page.)

*Primary Examiner*—James P. Trammell
*Assistant Examiner*—Matthew B. Smithers
*Attorney, Agent, or Firm*—Woodcock Washburn Kurtz Mackiewicz & Norris LLP

[57] ABSTRACT

The "next best view" (NBV) problem encountered while acquiring the surface geometry of an object using a range scanner is solved by determining the next position for the range scanner given its previous scans of the object. A new representation, positional space, is used as a unified data structure for representing what must be and what can be scanned. The image of the range scanner in positional space is computed off-line for particular positions of the range scanner in its work space and stored in a file. Then, when the next best view is to be determined during the analysis of the object, each scanner image is simply retrieved from the file instead of being recreated by translating the scanner image calculated for some other position on the work space of the range scanner. A linear objective function of the stored scanner images and images of a seen and an unseen surface of the object is then maximized over all scanner positions to determine the next best view. This approach accommodates all range based sensors and allows arbitrarily shaped positional space surfaces and work spaces to be used while also saving in on-line computation time.

9 Claims, 5 Drawing Sheets

OTHER PUBLICATIONS

Kemmotsu, et al., Sensor Placement Design for Object Pose Determination with Three Light–Stripe Range Fingers, *IEEE Int. Conf. on Robotics and Automation*, San Diego, CA, 1994, pp. 1357–1364.

Maver, et al., Occlusions as a Guide for Planning the Next View, *IEEE Transactions on Pattern Analysis and Machine Intelligence*, vol. 15, No. 5, May 1993, pp. 417–433.

Kehtarnavaz, et al., A Framework for Estimation of Motion Parameters from Range Images, *Computer Vision, Graphics, and Image Processing*, vol. 45, 1989, pp. 88–105.

Richard Pito, A Solution to the Next Best View Problem for Automated CAD ModelAcquisition of Free–form Objects Using Range Cameras, *Technical Report, University of Pennsylvania GRASP Laboratory*, Philadelphia, PA, Apr. 1995, pp. 1–19.

Richard Pito, Mesh Integration Based on Co–Meausrements *IEEE Int. Conf. on Image Processing*, Sep. 1996.

Richard Szeliski, Estimating Motion from Sparse Range Data without Correspondence, *IEEE 2nd Int. Conf. Computer Vision*, Tarpon Springs, Fl., Dec. 1988, pp. 207–216.

Tarabanis, et al., A Survey of Sensor Planning in Computer Vision, *IEEE Transactions on Robotics and Automation*, vol. 11, No. 1, Feb. 1995, pp. 86–104.

Turk, et al., Zippered Polygon Meshes from Range Images, *Computer Graphics Proceedings, Annual Conference Series*, 1994.

Whaite, et al., Autonomous Exploration: Driven by Uncertainty, *IEEE, Centre for Intelligent Machines*, McGill University, Montreal, Quebec, Canada, 1994, pp. 339–346.

Whaite, et al, From Uncertainty to Visual Exploration, *Proc. Int. Conf. on Computer Vision*, 1990, pp. 690–697.

Lambert Wixson, Viewpoint Selection for Visual Search, *Proc. CVPR '94*, 1994, pp. 800–805.

Xie, et al., Planning Views for the Incremental Construction of Body Models, *Proc. 8th Int. Conf. on Pattern Recognition*, 1986, pp. 154–157.

Bergevin, et al., "Estimating the 3D Rigid Transformation Between Two Range Views of a Complex Object," *Proceedings of the 1992 IEEE International Conference on Pattern Recognition*, 1992, pp. 478–482.

Chen, et al., "Object modelling by registration of multiple range images," *Image and Vision Computing*, 10(3), Apr. 1992.

Chen, et al., Surface Level Integration of Multiple Range Images, *Proc. Workshop on Computer Vision in Space Applications*, France, Sep. 1993.

Curless et al., "Better optical triangulation through space–time analysis", *Inter. Conf. on Computer Vision*, 1995.

Adrian Hilton, "On Reliable Surface Reconstruction from Multiple Range Images," *Technical Report VSSP–TR–5/95*, Dept. of Electronic & Electrical Engineering, University of Surry, Guildford, UK, Oct. 1995.

Kahn, et al., "Traditional galleries require fewer watchmen," *Technical Report IBM Res. Rp. RJ3021, IBM, NY*, 1980.

Miura, et al., "Task–Oriented Generation of Visual Sensing Strategies," *Inter. Conference on Computer Vision*, 1995, pp. 1106–1113.

Richard Pito, Characterization, Calibration, and Use of the Perceptron Laser Range Finder in a Controlled Environment, *Technical Report MS–CIS–95–05*, University of Pennyslvania, GRASP Laboratory, Philadelphia, PA, Jan. 1995.

Schroeder, et al., "Decimation of Triangle Meshes," *Computer Graphics*, 26(2):65–70, 1992.

POSITIONAL SPACE SOLUTION TO THE NEXT BEST VIEW PROBLEM

STATEMENT OF GOVERNMENT INTEREST

The present invention was developed as part of the ACORN project and funded under MCC/Air Force Contract F33615-94-C-4400. The Government may have certain rights in the invention.

BACKGROUND OF THE INVENTION

1. Field of the Invention

The present invention relates to a technique for determining the next best view during the automated acquisition of the complete surface geometry of objects using range cameras. More specifically, the present invention determines, off-line, the visibility of part of the viewing volume only once, not for each potential position of the range camera, but for pre-designated positions about an arbitrary positional space surface (PSS) which records ranging and observation rays as they penetrate the viewing volume.

2. Description of the Prior Art

The present invention addresses a problem encountered in the automated acquisition of three-dimensional models of objects using range cameras. In many fields ranging from computer aided design to manufacturing to the entertainment industries, it is desirable to obtain a computer model of an object's surface geometry quickly and cheaply. For this purpose, range cameras have been used to take images similar to ordinary cameras except that, instead of measuring the visible light irradiated by an object, a range camera measures the distance from the camera to the surface of the object. The advantage of using range cameras over fully three-dimensional imaging devices like X-ray machines is that range cameras are cheaper, safer, much easier to use, and can simultaneously acquire a color image of the scene. However, for all their advantages, range cameras cannot see through an object like an X-ray machine can and, accordingly, several range images of the object must be taken from different vantage points to acquire the complete surface description of the object. For example, to scan the inside rim of the handle of a coffee cup the range camera must be positioned in a special location to observe that surface. Since nothing is known a priori about the shape of the object before it is scanned, there can be no sequence of preset vantage points from which to scan the object which will guarantee that all visible surfaces of the object will be scanned.

The problem of how to automatically position and orient the range camera with respect to the object to acquire a complete surface description, based on what has already been scanned while making no assumptions about the geometry of the object, has been addressed in the prior art in proposed solutions to what is commonly referred to as the "Next Best View" (NBV) problem. Existing solutions to the NBV problem differ in the way unscanned portions of the viewing volume are represented and used. For example, in an article entitled "Occlusions as a Guide For Planning the Next View," *IEEE Transactions on Patt. Anal. and Mach. Intel.*, Vol. 15(5), pages 417–433, 1993, Maver et al. represent unscanned areas using polygons and compute for each quadrilateral patch of each polygon the positions of a range camera which have an unobstructed view of that patch. The next position is chosen to view as many patches as possible. Although successful, the algorithm does not generalize to any range camera and setup, nor does it consider the sampling physics of the range camera. On the other hand, in an article entitled "A 'Best-Next-View' Algorithm for Three-Dimensional Scene Reconstruction Using Range Cameras," *Intel. Robotics and Comp. Vision XIV Session of Intel. Sys. and Advanced Manufacturing Symp.*, SPIE, 1995, Banta et al. demonstrated an algorithm on synthetic range data represented using occupancy grids. In that system, the NBV is chosen from a set of three possible positions which are data dependent. In an article entitled "The Determination of Next Best Views," *Proc. 1985 IEEE Int. Conf. on Robotics and Automation*, pages 432–435, 1985, Connolly described the use of octrees to represent the viewing volume and counted the number of faces common to nodes hidden by object surfaces and nodes scanned as empty. Because no visibility computations are performed, this approach requires that the object does not self-occlude yet it is computationally cheap. In an article entitled "Autonomous Exploration: Driven By Uncertainty," *Proc. CVPR '94*, pages 339–346, 1994, Whaite et al. model objects in the scene with superquadrics and choose the NBV based on the direction from the current location of the sensor which will minimize the uncertainty of model parameters. A solution for the same problem but for intensity cameras is given by Wixson in an article entitled "Viewpoint Selection For Visual Search," *Proc. CVPR '94*, pages 800–805, June 1994, who chooses the range camera's next position as the one which would sample both sides of a previously identified occluding contour. A more detailed survey of range scanner literature can be found in an article by Tarabanis et al. entitled "A Survey of Sensor Planning in Computer Vision," *IEEE Transactions on Robotics and Automation*, Vol. 11(1), pages 86–104, February, 1995.

In addition to problems in the way the unscanned portions of the viewing volume are represented and used, any proposed solution to the NBV problem must overcome two difficulties, namely, the computational cost of examining a large number of potential scanning positions and the need to generalize it for use with any range camera and work space. The primary constraint on the camera's next position is that it sample into some unscanned portion of the viewing volume. For surface acquisition, from its next position the camera must resample part of the object already scanned and make sure the areas of the viewing volume it will scan actually can be scanned given the surfaces already scanned and the sampling physics of the range camera. These are the so-called overlap and scanning constraints respectively. As noted by Besl et al. in an article entitled "A Method for Registration of 3-D Shapes," *IEEE Transactions on PAMI*, Vol. 14(2), pages 239–256, 1992, the overlap constraint must be satisfied to register the range images. Registration is required due to noise in the motion platform(s) of the object/camera. In addition, as described by Pito in an article entitled "Mesh Integration Based on Commeasurement," *International Conference on Image Processing, IEEE*, September 1996, by Turk et al. in an article entitled "Zippered Polygon Meshes From Range Images," *Computer Graphics Proceedings, Annual Conference Series, SIGGRAPH*, 1994, by Curless et al. in an article entitled "A Volumetric Method for Building Complex Models from Range Images," *Computer Graphics Proceedings, Annual Conference Series, SIGGRAPH*, August 1996, and by Hilton in Technical Report VSSP-TR-5/95 entitled "On Reliable Surface Reconstruction from Multiple Range Images," Dept. Of Electronic & Electrical Engineering, Univ. of Surrey, Guildford, GU2 5XG, UK, October, 1995, range images should overlap to allow for their integration. The scanning constraint also must be satisfied for the primary and overlap constraints to be satisfied. Because some form of ray tracing is required to determine the visibility of a surface or portion of the viewing volume, satisfying this constraint, or set of constraints depending on the range camera, is computationally expensive.

In addition, a solution to the NBV problem should be self-terminating to allow for fully automated surface acquisition. Moreover, as noted by Pito in Technical Report MS-CIS-95-05 entitled "Characterization, Calibration, and Use of the Perceptron Laser Range Finder in a Controlled Environment," Univ. of Pennsylvania GRASP Laboratory, Philadelphia, Pa., January, 1995, many range cameras sample with different accuracy depending on their orientation to a surface. Accordingly, a NBV solution should be able to position the camera to resample low-confidence surfaces with higher confidence.

The present invention has been designed to address the above-mentioned problems which should be addressed by solutions to the NBV problem. The closest known approach to that described below is that implemented by a machine produced by Digibotics Inc. which can position a single laser spot (i.e., a single ranging ray) so that it lies perpendicular to the surface being measured. This is performed by moving the object and the laser source simultaneously. However, that solution is not general in the sense that it could work for any range camera. The present invention solves the much more general problem of determining the NBV for a densely sampling range camera.

In a more general solution to the NBV problem proposed by the present inventor, a positional space surface was defined to represent the hypothetical sampling directions possible for a particular range camera, the sampling directions which could scan into the unseen portions of the viewing volume, and those which could rescan parts of the object. Positional space was used to make explicit the actual sampling directions available given a particular range camera and the set of relative motions possible in the work space with respect to the object being scanned. A solution to the NBV problem was achieved by aligning the positional space representation of the range camera with the positional space representation of the scanned portions of the object and the unseen portions of the viewing volume using simple translations of the positional space representation of the range camera. Since the complex motions of the range camera in its work space were represented by simple translations in positional space, the search for the next best view was computationally inexpensive. Unfortunately, in that approach to the NBV problem, the shape of the positional space surface must correspond to the shape of the work space of the range camera, thus limiting the scope of the solution to the NBV problem. A more generalized approach to the NBV problem is desired which permits the work space of the range camera to have any desired shape for any range camera. The present invention has been developed for this purpose.

SUMMARY OF THE INVENTION

The present invention is concerned with building a surface description of an object from multiple range images with no a priori knowledge about the geometry or topology of the object except that the object fit within the viewing volume of the range camera. The present invention solves the NBV problem by building a surface model by incrementally adding range data to a partial model until the entire object has been scanned. Once the first scan has been taken to form the initial (partial) surface model, the process consists of four repeated steps: determining the next best view (NBV) and moving the object and/or the camera, scanning the object again, registering the new range data with the model, and integrating the new range data with the model. Specifically, the invention relates to solving the NBV problem by determining the optimal next position for the range camera in its work space given the range data already acquired. Every step in the process imposes constraints on the solution to the NEV problem each of which is addressed by the invention.

More specifically, the invention comprises a unique data structure referred to as a "positional space" (PS), software for creating and manipulating that data structure in order to determine the next best view (NBV), and techniques for representing those portions of the object which have not been scanned. The invention is based on the fact that range cameras measure range along specific rays, or ranging rays (RR). In addition, a surface patch of the object can be measured only from a certain set of viewing directions called observation rays (OR). If a RR and an OR are found to coincide, then the range camera generating that RR will scan the surface with that OR. Positional space is a way to represent RRs and ORs so that their coincidence can be checked very quickly.

In accordance with a preferred embodiment of the invention, the most computationally intensive operation performed by the solution to the NBV problem, namely, determining that a portion of the viewing volume would be visible from a particular vantage point, is performed only a small fixed number of times for each area of the viewing volume of interest, not for each potential position and orientation of the range camera. The solution is made independent of a particular positional space surface by allowing the coordinates of the desired scanning positions to be specified in positional space at points independent of a particular positional space surface, such as a cylinder or sphere, conventionally used to define the viewing volume. In other words, for a general solution, the positional space surface may be any shape which encloses the object. N different positions of the range camera with respect to the arbitrary positional space surface may be computed off-line to form the image of the range camera for each predetermined position the range camera may take. This allows the NBV position for the range camera to be determined within a predetermined tolerance without extensive on-line computations and without worrying about the work space limitations of the range camera.

BRIEF DESCRIPTION OF THE DRAWINGS

The objects and advantages of the invention will become more apparent and more readily appreciated from the following detailed description of presently preferred exemplary embodiments of the invention taken in conjunction with the accompanying drawings of which.

DETAILED DESCRIPTION OF PRESENTLY PREFERRED EMBODIMENTS

A technique for determining the next best view during the automated acquisition of the complete surface geometry of objects using range cameras including the above-mentioned beneficial features in accordance with a presently preferred exemplary embodiment of the invention will be described below with reference to FIGS. 1–4. It will be appreciated by those of ordinary skill in the art that the description given herein with respect to those figures is for exemplary purposes only and is not intended in any way to limit the scope of the invention. For example, those skilled in the art will appreciate that the image acquisition system described may be used for computer graphics applications as well as in fields such as computer aided design, manufacturing, computer vision, robotics, and the like. Accordingly, all questions regarding the scope of the invention may be resolved only by referring to the appended claims.

Figure 1:
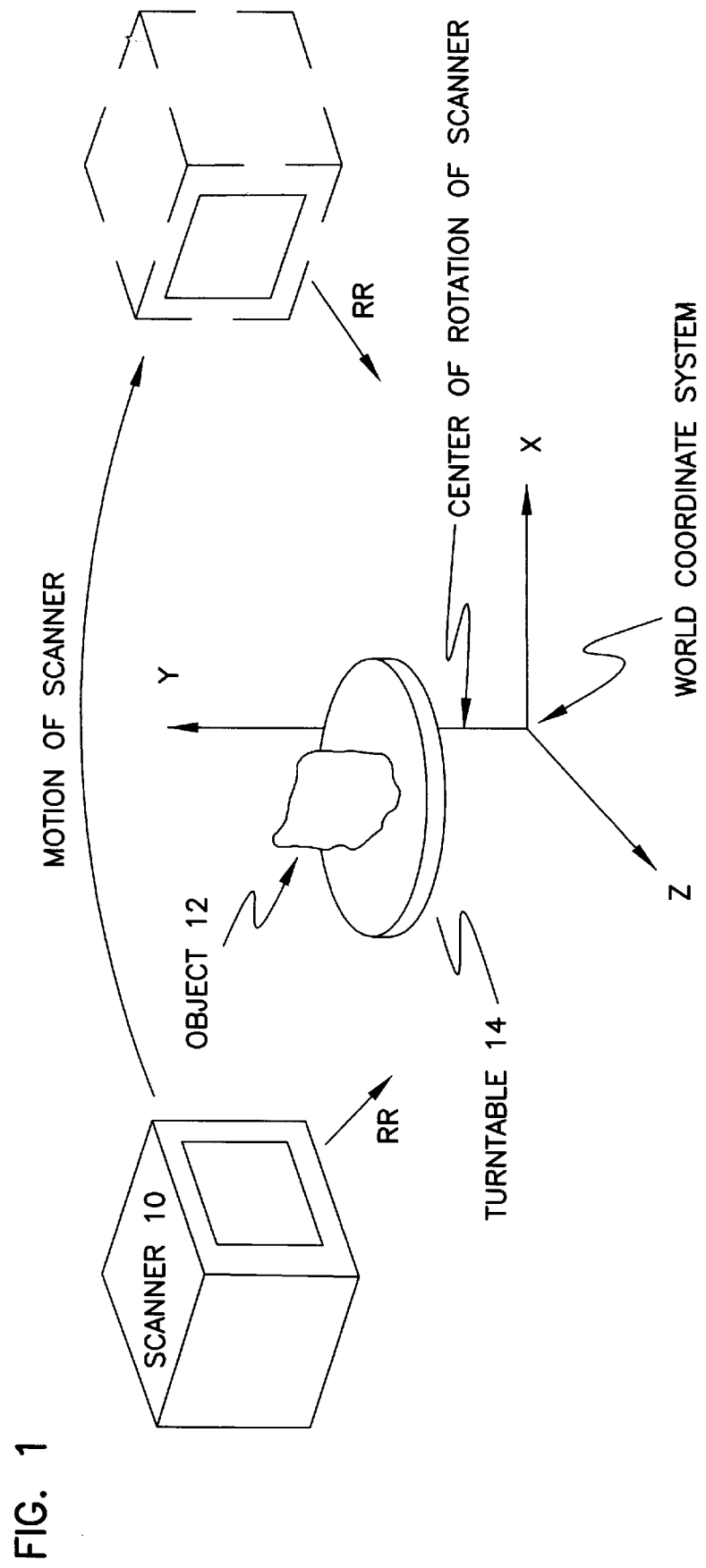
FIG. 1 illustrates a range camera set up to scan an object placed on a turntable.

FIG. 1 illustrates a sample setup of a range camera 10 in relation to an object 12 whose three-dimensional surface geometry is to be determined in accordance with the techniques of the invention. A sample scanning setup will be described with respect to FIG. 1 to facilitate an understanding of the technique for determining the next best view (NBV) as described below. As illustrated in FIG. 1, the setup consists of a Cyberware© PS cylindrical scanner 10 and a computer controlled turntable 14. Scanner 10 is described herein interchangeably as a camera or a scanner. The cylindrical scanner 10 measures range using triangulation principles well known by those skilled in the art. Using known techniques, the cylindrical scanner 10 projects a vertical light stripe into its viewing area and rotates 90° about a fixed line to acquire a 512×450 range image. The object 12 is placed on the turntable 14 which lies within the scanning area. The viewing volume for the setup in FIG. 1 is a cylinder with the turntable 14 as its base. Even though it is the turntable 14 which rotates, it is useful to think of positioning the cylindrical scanner 10 at some point on a circle whose center coincides with that of the turntable 14 in order to define the work space of the cylindrical scanner 10. Those skilled in the art will appreciate that a solution to the NBV problem for this setup would determine a rotation for the turntable 14.

Each pixel (or small neighborhood of pixels) of a dense sampling range scanner 10 measures range along a unique ray in world coordinates called the pixel's ranging ray (RR). It is important to model the RRs of the scanner 10 to properly interpret its range data and to determine if an object 12 would self-occlude from a given position of the scanner 10. The RRs of scanner 10 may be represented as parallel rows converging on the center of rotation of the scanner 10.

On the other hand, all of the RRs which could sample a planar surface patch T are called the observation rays (ORs) of T. An OR $\bar{o}$ has an associated confidence $c_{\bar{o}}$ which is usually a function of the angle between the surface normal, $\bar{n}_T$, and $\bar{o}$, i.e., $c_{\bar{o}} = \bar{n}_T \cdot (-\bar{o})$. Those skilled in the art will appreciate that most range scanners do not even produce range samples if $\bar{n}_T \cdot (-\bar{o}) < \cos(\theta_b)$ where $\theta_b \approx 60°$ is the breakdown angle determined from calibration of the range scanner 10. In other words, only those ranging rays which would produce measurements of a surface are considered to be observation rays.

Figure 2A:
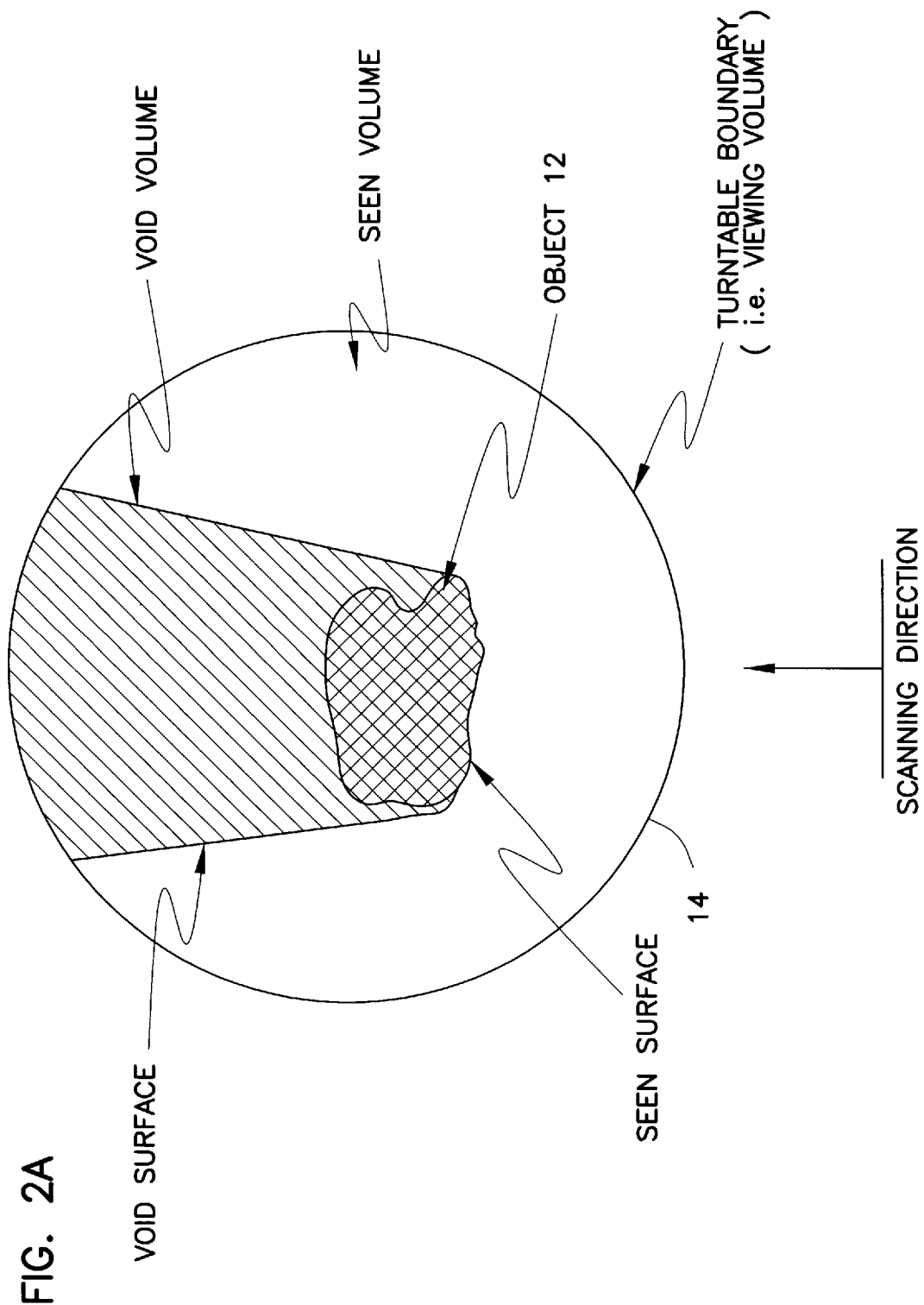
FIG. 2(a) illustrates the partitioning of the viewing volume after one range image into a "seen" volume and a "void" volume.

Each time a range image is taken, the viewing volume is partitioned into a seen volume and a void volume, i.e., unseen volume, as shown in FIG. 2(a). In addition; the surface of the void volume, i.e., the surface separating the seen volume and the void volume, is referred to as the void surface, while the surface of the object 12 which has been scanned is referred to as the seen surface. Since the void surface is oriented to represent a surface which is just slightly too oblique to be sampled, it splays outward from the seen surface as shown in FIG. 2(a).

Figure 2B:
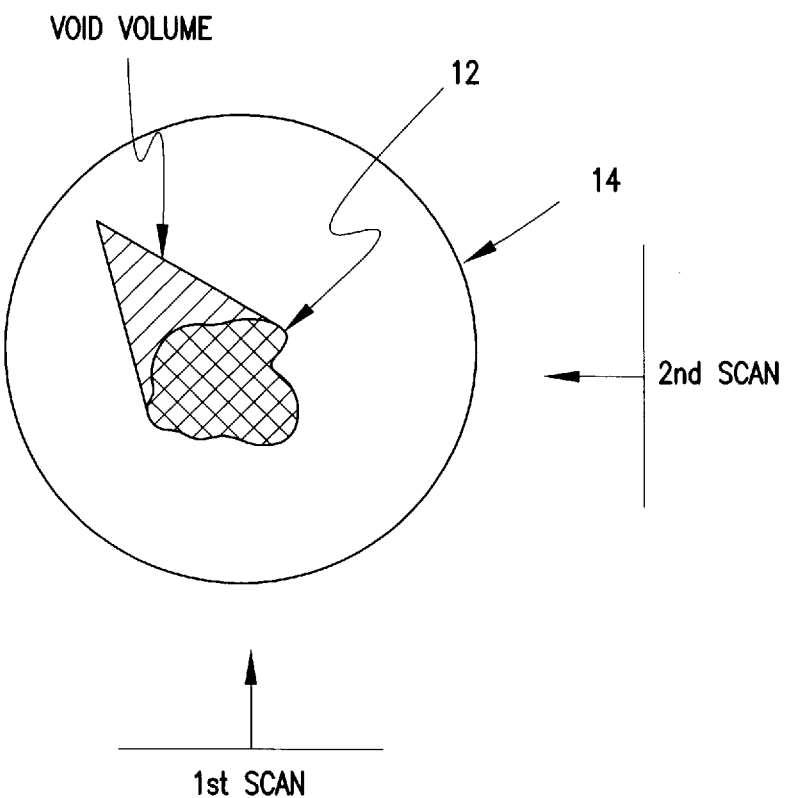
FIG. 2(b) illustrates the partitioning of the viewing volume after two range images into a "seen" volume and a "void" volume.

Since the surface of the object 12 must continue from the edge of the seen surface into the void volume, this is the best place to look for the unseen surfaces of object 12. Therefore, the primary constraint is satisfied by positioning the scanner 10 so that it samples the void surface near the edge of the seen surface. FIG. 2(b) shows how the scanner 10 is positioned to look into the void volume and how the new range data reduces the size of the void volume. By continuing in this fashion, the void volume is reduced until it lies entirely within the seen surface at which point the surface geometry is completely defined.

The void volume may be economically represented by recognizing that it is only necessary to define the void surface near the edges of the object 12, i.e., where the void and seen surfaces meet. Rectangular void patches comprising two coplanar triangles are thus defined which are attached to the edge of the seen surface and which are oriented so that they lie on the void surface. Each edge of the seen surface has a void patch associated with it. As described by Schroeder et al. In an article entitled "Decimation of Triangle Meshes," Computer Graphics, Vol. 26(2), pages 65–70, 1992, the object data and range data may be represented as triangular meshes which have been decimated. If the range scanner 10 is positioned to sample some void patches, then the range scanner 10 will be certain to sample into the unseen portions of the viewing volume so as to reduce its size. It is desirable in accordance with the invention that the range scanner 10 be positioned so that it samples as many void patches as possible.

Figure 2C:
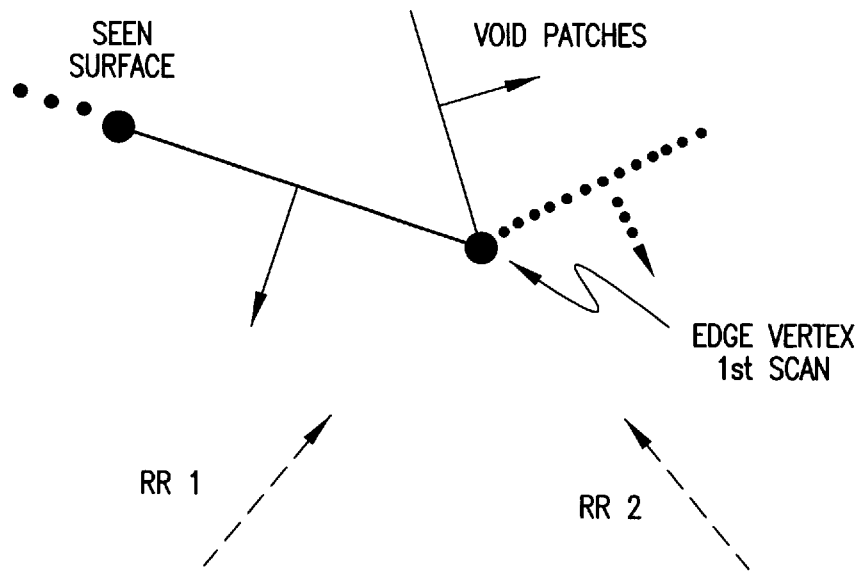
FIG. 2(c) illustrates the selection of a void patch as the most restrictive void patch when more than one are available.

Each void patch is oriented to represent a surface which is just oblique enough to be visible to the scanner 10. If two or more RRs from different range images sample an edge point, then the orientation of the void patch for the edge is defined with respect to the RR which forms the smallest angle with the surface, as shown in FIG. 2(c). In the case of holes in the mesh caused by range discontinuities, the void patch of the interior edge, i.e., the one farthest from the scanner 10, is reoriented to lie along the gap between the two edges. The void patches of small holes are similarly redirected to lie across the hole.

The angle between the normal of a void patch and the ranging ray which sampled the vertices on that edge of the seen surface is equivalent to the breakdown angle. Thus, the void patch lies on the void surface and so represents a hypothetical surface which, if it existed, would be slightly too oblique to be scanned by the range camera 10. When more than one RR has sampled an edge point, the void patch for that edge is set to be the one which forms the smallest area between itself and the backside of the surface. FIG. 2(c) shows a birds-eye view of a surface and two potential void patches. The patch which makes the void volume the smallest is chosen.

The seen surface, on the other hand, is composed of triangles embedded in three-space. Since all of the detail of the object 12 is not needed to compute the NBV, the seen surface is decimated. The resulting surface mesh usually contains fewer than a third the number of original triangles, is within 1 mm of the original mesh, maintains the original topology, and is much more manageable computationally.

POSITIONAL SPACE

If a RR and an OR are collinear, then the range scanner 10 generating the RR will sample the surface patch with the OR. Positional space represents the RRs of the range scanner 10 and the ORs of the seen surface and void patches in a single data structure which makes it easy to check for collinearity. In accordance with the invention, positional space is a scalar field composed of two subspaces designed to record ranging and observation rays (RORs) as they penetrate the viewing volume. A positional space surface (PSS) records a point along each ROR and so must enclose the entire viewing volume. The positional space directions (PSD) record the direction of a ROR in a local polar coordinate system defined for each point on the PSS.

Figure 3:
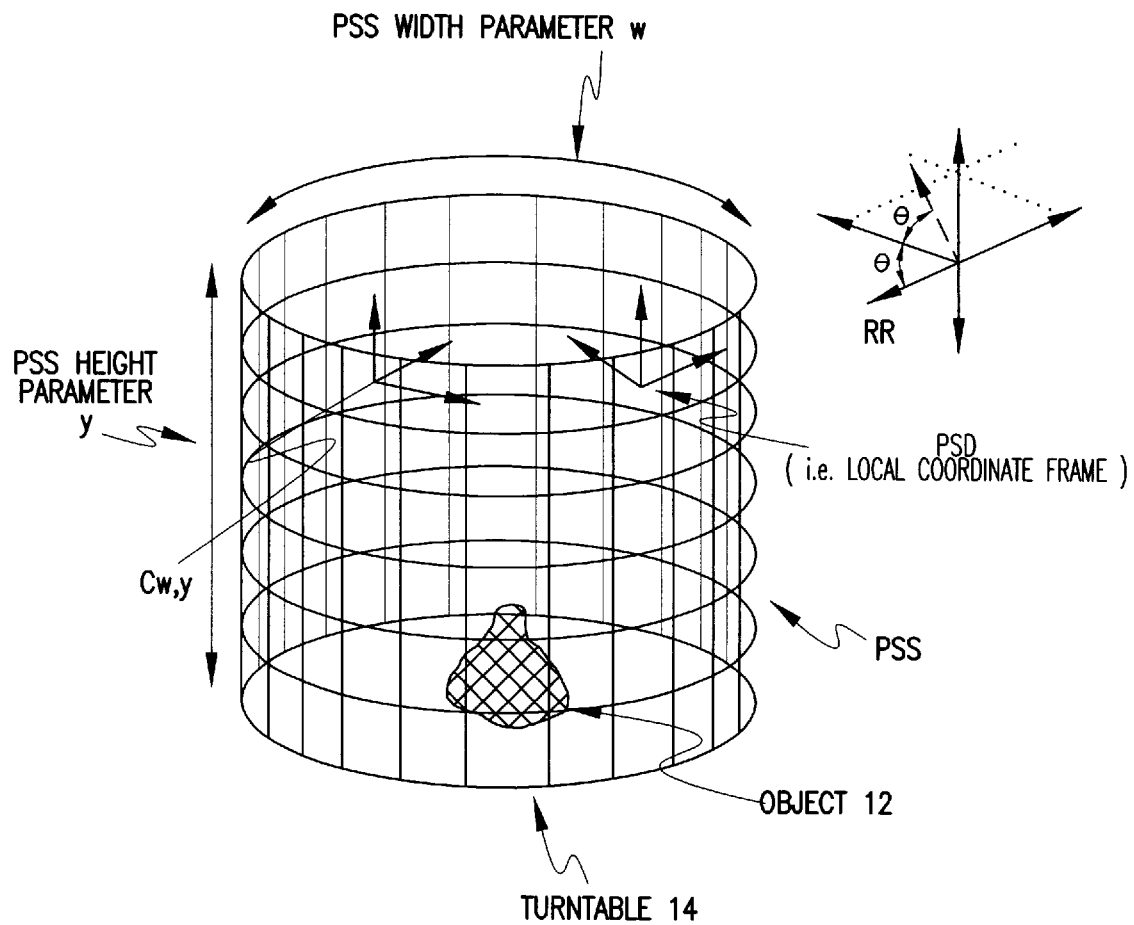
FIG. 3 illustrates the positional space coordinate system and the positional space surface in accordance with the invention.

The PSS is discretized into uniform cells $C_{w,y}$ for representation. As shown in FIG. 3, the PSS for the scanning setup shown in FIG. 1 may be shaped like a cylinder since the work space is circular and the PSS must enclose the viewing volume. Generally, the work space is the set of all positions the range scanner 10 may occupy with respect to the object 12 being scanned. The PSD is a unique polar coordinate system attached to each cell $C_{w,y}$ of the PSS and is also discretized for representation. One axis of each coordinate system of the PSD is coincident with the surface normal at the center of that cell of the PSS. In the setup of FIG. 3, positional space is a 4 dimensional scalar field $P(w,y,\theta,\phi)$ where a point on the PSS is located by w and y, where w is the distance around the cylinder from the origin and h is the height up the cylinder, and the PSD is spanned by $\theta$ and $\phi$, which are the angles in the local coordinate system centered at the point of the PSS defined by w and y where these angles define the direction of a ROR in three-dimensional space.

The observation that if a RR and an OR coincide the OR's surface patch will be sampled by the range scanner 10 generating that RR can now be expressed in terms of positional space: if an OR and a RR occupy the same point in positional space, the OR's surface will be sampled by the range scanner 10 generating that RR. To make this test, it is necessary to produce the positional space image of the surface of object 12, the void surface's void patches, and the scanner 10.

The void surface's image in positional space is found by representing the ORs of each void patch in positional space. Given some OR $\bar{o}$ which intersects the PSS at cell $C_{w,y}$ with direction $(\theta,\phi)$ defined in the local polar coordinate system, $\bar{o}$ projects to the point $(w,y,\theta,\phi)$ in positional space, written $\bar{o}\sim(w,y,\theta,\phi)$. An OR will not project to positional space if it does not intersect the PSS or if it intersects another part of the surface of the object 12 before hitting the PSS or if some other constraint applies. The void surface's representation in positional space $P_v$ is the weighted sum of all the confidences of all of the observation rays of the void patches that project to positional space and is thus defined as:

$$P_v(w,y,\theta,\phi) = \begin{cases} \Sigma_{\bar{o}} \|e_T\| c_{\bar{o}} & \forall \bar{o} \sim (w,y,\theta,\phi) \\ 0 & \text{otherwise} \end{cases} \quad \text{Equation (1)}$$

where $\bar{o}$ is an OR of a void patch, $\|e_T\|$ is the area of the triangle of the object 12 that the void patch is attached to and $c_{\bar{o}}$ is the confidence of $\bar{o}$ as defined above.

Similarly, the representation of the seen surface in positional space $P_s$ is the weighted sum of all the confidences of the observation rays of the triangles of the seen surface that project to positional space and is defined as:

$$P_s(w,y,\theta,\phi) = \begin{cases} \Sigma_{\bar{o}} \|T\| c_{\bar{o}} & \forall \bar{o} \sim (w,y,\theta,\phi) \\ 0 & \text{otherwise} \end{cases} \quad \text{Equation (2)}$$

where $\bar{o}$ is an OR of a triangle T of the object.

Thus, the image of the void surface in positional space, $P_v$, is defined as the confidence weighted sum of the areas of the triangles along the boundary of the seen surface whose observation rays intersect the PSS, and the image of the seen surface in positional space, $P_s$, is defined in a similar way except that the observation rays of each surface patch of the partial model of the object are used instead. The invention chooses the next camera position by selecting that position whose ranging rays are collinear with as many observation rays of the void patches (weighted as in Equation (1)) while at the same time ensuring that at least a certain minimum number of ranging rays are collinear with observation rays from the object's scanned surface (weighted according to Equation (2)).

Each RR is projected into positional space by intersecting it using standard ray tracing techniques with the PSS to determine the values for w and y. Then, the direction the ray is traveling is computed in the local coordinate system defined by the PSD to determine values for $\theta$ and $\phi$. All of the ORs of each void or surface patch are projected by first finding the cell $C_{w,y}$ of the PSS which the OR parallel to the patch's normal intersects and then examining all adjacent cells until the angle between the OR and the normal of the surface patch exceeds the breakdown angle $\theta_b$. Scanning constraints are enforced by ray tracing the ORs through the viewing volume and noting any intersections. However, in accordance with the invention, these expensive ray tracing operations are performed only for those cells of the PSS which could be visible from the patch and not for each potential position of the scanner 10.

This is the crux of the computational savings achieved by using positional space in accordance with the techniques of the invention.

In accordance with the invention, the image $P_c^i$ of the range scanner 10 in positional space at position i in the camera's work space is computed off-line for each position i of the range scanner 10 and stored for use on-line when the image of the range scanner is used to compare OR and RR. Let $\rho$ be the set of the n different positions of the range scanner 10 which are to be tested. To construct the image $P_c^i$ in positional space of the range scanner 10 at position $i \in \rho$, the value of each cell of $P_c^i$ that a RR r of the scanner 10 projects to is set to one. In other words:

$$P_c^i(w,y,\theta,\phi) = \begin{cases} 1 & \text{if some } RR\ \bar{r} \rightarrow (w,y,\theta,\phi) \\ 0 & \text{otherwise} \end{cases} \quad \text{Equation (3)}$$

Each $P_c^i$ need be computed only once, before the next best view calculating software is run. The next best view (NBV) is then determined on-line by maximizing a non-linear objective function $N()$ over $i \in \rho$:

$$N(i) = o(o_v(i), o_s(i)) \quad \text{Equation (4)}$$

where $$o_v(i) = \sum_w \sum_y \sum_\theta \sum_\phi P_c^i(w,y,\theta,\phi) P_v(w,y,\theta,\phi) \quad \text{Equations (5) \& (6)}$$

-continued $$o_s(i) = \sum_w \sum_y \sum_\theta \sum_\phi P_s^i(w,y,\theta,\phi) P_v(w,y,\theta,\phi)$$

and o(v,s) is some function whose parameters are understood to be the "amount" of void surface v and seen surface s visible by the scanner 10 from position i. Since $P_c^i$ is computed off-line and it is very sparse, Equations (5) and (6) are very cheap to compute. Once $P_s()$ and $P_v()$ are determined, the computational barrier of examining even thousands of scanner positions is broken. For example, in a sample configuration of FIG. 1, 180 evenly spaced positions in the work space of the scanner 10 were chosen, where the camera's work space is the circle whose center is the center of the turntable 14. The turntable 14 was then rotated to the angle α=360i/180 where i maximizes N().

In order to view as many void patches as possible, the function o(v,s) should simply equal v. However, this does not take into consideration the overlap constraint. This information is provided by the parameter s, i.e., how much of the surface of the object 12 would be resampled from position i. Good results have been achieved with the simple non-linear function:

$$o(v,s) = \begin{cases} v & \text{if } s > t \\ 0 & \text{otherwise} \end{cases} \quad \text{Equation (7)}$$

for some threshold t, where the choice of t is dependent on the complexity of the object 12 and how difficult it will be to register range images given a certain amount of overlap.

The surface geometry acquisition process for object 12 halts if the scanner 10 cannot be positioned to scan any more void patches or if the number of void patches visible falls below a certain threshold. If at any time the scanner 10 cannot be positioned to sample at least t amount of the surface of the object 10, then the process also terminates.

In order to sample all visible surfaces of the object 12 in accordance with the invention with at least a minimum confidence u, the representation of the void volume $P_v$ need simply be extended to include the ORs of those triangles of the object 12 with lower confidences than u. The confidence $C_T$ of a triangle T is the minimum confidence of its three vertices whose confidences are simply the angle between the RR of the vertex and T's normal. Namely:

$$P'_v(w,y,\theta,\phi) = \begin{cases} \sum \bar{o}_v \| e_T \| c\bar{o}_v & + \forall \bar{o}_v, \bar{o}_s \rightarrow \\ \sum \bar{o}_s \| T \| (u - c_T) & (w,y,\theta,\phi) \\ & \text{and } c_T < u \\ 0 & \text{otherwise} \end{cases} \quad \text{Equation (8)}$$

where $\bar{o}_s$ is an OR of the triangle T of the object, and $\bar{o}_v$ is an OR of a void patch attached to the triangle $e_T$. There is no additional cost in computing $P_v'()$ over $P_v()$ since the process of projecting the void and seen surfaces into positional space remains the same.

A general solution to the NBV problem in accordance with the invention is obtained for nearly any range scanner 10 and work space by completely enclosing the viewing volume with the PSS. For example, a PSS shaped like a sphere will record the RRs of any range scanner and all ORs. In the general case, computing $P_v$ and $P_s$ may become expensive because the RRs need not be parallel to the base of the viewing volume as is the case for the setup of FIG. 1; however, hardware assisted ray tracing can be used and computing Equations (5) and (6) remains cheap.

Figure 4:
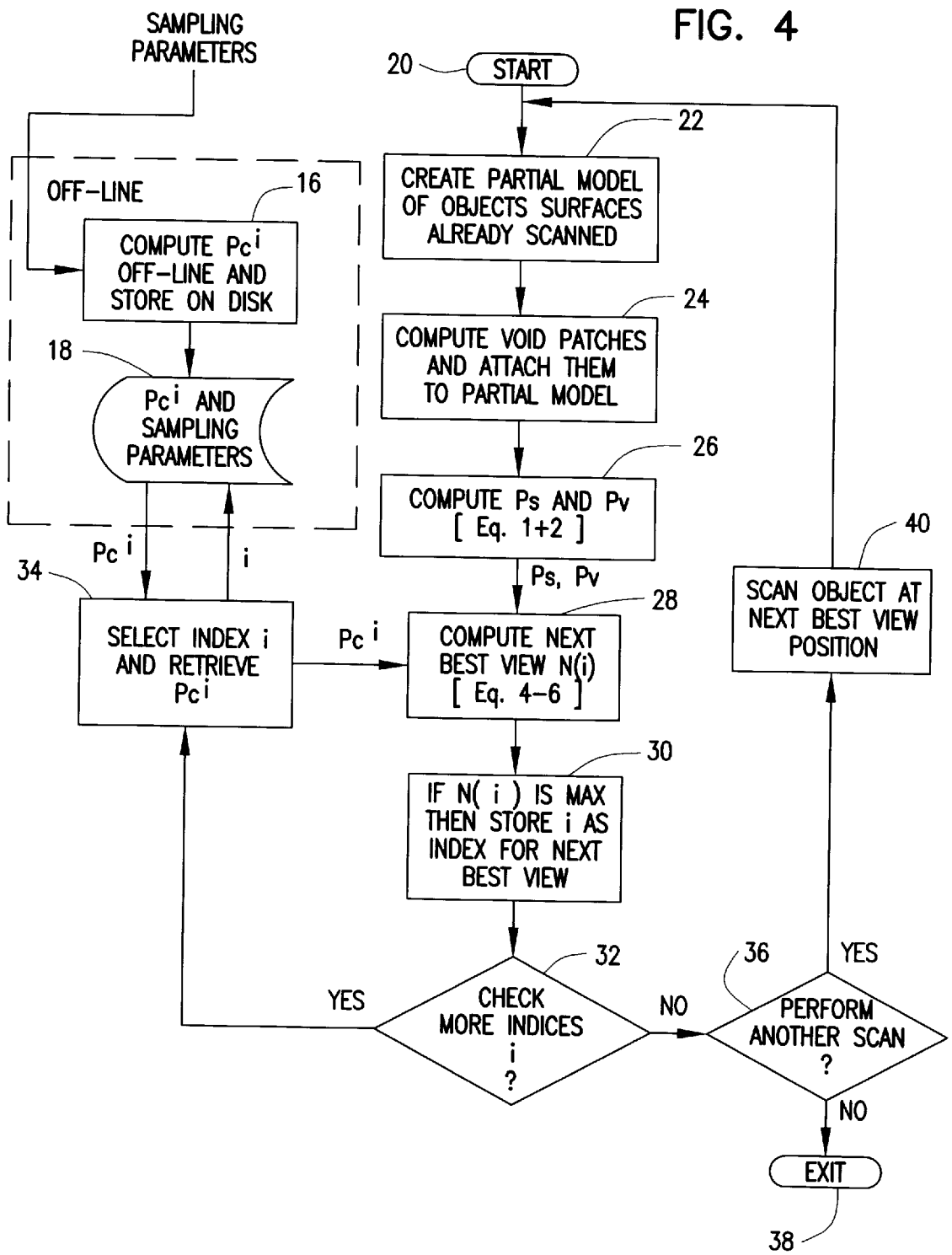
FIG. 4 illustrates a flow diagram of a software routine for selecting a next best view in accordance with the techniques of the invention.

FIG. 4 illustrates a flow diagram of a software routine for selecting a next best view in accordance with a preferred embodiment of the invention. Those skilled in the art will appreciate that the software routine of FIG. 4 may be implemented on a computer used to model an object in world coordinates. The output of FIG. 4 also may be used to control a range scanner during acquisition of the surface geometry of an object Those skilled in the art will also appreciate that the software routine of FIG. 4 may also be implemented in a robot arm or the like to find a gripping location of an object.

The next best view software routine of the invention is characterized by the fact that the image $P_c^i$ of the range scanner 10 is computed off-line at step 16 using, for example, Equation (3) described above, and stored with certain sampling parameters describing how to bring the range scanner 10 to the specified position. For example, such sampling parameters may include field of view, resolution, magnification ("zoom"), and focus of the range scanner 10. The calculated image data $P_c^i$ and sampling parameters are stored on a storage medium such as a disk 18 and are later accessed by specifying the index i. Once the data is stored, the acquisition system is ready to start scanning the unknown object for on-line data acquisition.

As shown in FIG. 4, the object acquisition software starts at step 20 by taking an initial scan of the object and at step 22 creates a partial model of the object's surfaces from that scan. Such a model may be created, for example, using the output from an integration algorithm of the type described in an article by the present inventor entitled "Mesh Integration Based on Commeasurement," *International Conference on Image Processing, IEEE*, September 1996. Once the partial model for the object 12 is created at step 22, the void patches are computed at step 24 and attached to the partial model as described above. The image of the seen surface, $P_s$, and the image of the void surface, $P_v$, are then calculated at step 26 from Equations 1 and 2 above. At step 28, $P_s$ and $P_v$ are then used with the range scanner images $P_c^i$ to compute the next best view N(i) from Equations (4) through (6) given above. Then, at step 30, it is determined if the current next best view N(i) has the maximum value of those next best views N(i) determined thus far. If so, the current index i is stored as the index into memory 18 for the NBV sampling parameters and range scanner image data $P_c^i$. At step 32, it is determined whether more indices i are to be checked. If more indices i are to be checked, the indices i are selected at step 34 and used to retrieve the range scanner image data $P_c^i$ for that index i from memory 18. The image data $P_c^i$ is then used in step 28 for a determination of the next best view for the current index i. This process repeats until it is determined at step 32 that no more indices i are to be checked. Typically, the routine is exited when i=N, and when i<N the processor is instructed to retrieve the item i+1, starting with i=0. Of course, the indices to be checked may be the output of a function specified by the user or may be predetermined indices used for particular types of objects 12.

If no more indices are to be checked at step 32, it is determined at step 36 whether another scan of the image is to be conducted. If the object has been fully acquired, no more scans are necessary and the routine is exited at step 38. The sampling parameters specified by the index i determined to have the next best view are provided as output as well as the model of the object's surface. On the other hand, if another scan is to be performed, the object is scanned from the next best view position just determined, and the resulting data is used in step 22 to update the particular model of the object. The process then repeats until the object's surface data is fully acquired.

Those skilled in the art will appreciate that it is not strictly necessary for the invention to try each index i and see which one makes N(i) a maximum. Instead, the database could be organized to do a form of gradient descent if the differentials between the respective values of N(i) could be defined. On the other hand, the routine could first determine the best position and orientation for the range scanner 10, and for this particular position and orientation, several different ways of sampling the data which are independent of the position and orientation of the range scanner 10 may be used. These different sampling techniques could be called sub-sampling parameters just to give them a name. By "independent" it is meant that if the current position and orientation are optimal, then it cannot be the case that a better sampling situation could be obtained from another position and orientation no matter what the choice of sub-sampling parameters. Once the best position and orientation are found, the sub-sampling parameters could be searched to find the best one.

The technique described herein is a significant improvement over techniques which limit the shape of the positional space surface to that of the workspace of the range scanner 10 and which do not make allowances for other sampling parameters such as zoom. It is no longer necessary to translate the range scanner 10 in parameter space along the hyperplane defined by the positional space surface in positional space. Indeed, the workspace may have any desired shape in accordance with the invention.

The use of positional space as described herein breaks the computational burden of finding the NBV from many possible choices. Expensive scanning constraints are performed only once and not for each possible position of the scanner 10. The image $P_c^i$ of the range scanner 10 in positional space is computed off-line for particular positions of the range scanner 10 in its work space. Thus, a set of parameters C which controls the position of the range scanner 10 in its work space and can include parameters which effect things like the resolution, field of view, focus, magnification, and size of the range image, as well as N different sets of parameters the user is interested in (i.e., N different "positions" of the range scanner 10, where N is large), can be used off-line in the computation of the image of the range scanner 10 in positional space for each position i before the object analysis is performed. The images of the range scanner 10 are computed only once and stored in a file 18. Then, when the next best view is to be determined during the analysis of the object 12, each $P_c^i$ is simply retrieved from the file 18 using i as an index to the file instead of being recreated by translating in the plane defined by the PSS in positional space the image of the range camera 10 in positional space for a default position and orientation of the range cameras as was previously done. Since the number of cells of each $P_c^i$ which have non-zero values is very small, the resulting data structure is reasonably small and can be stored on disk for quick retrieval or even stored in memory. Pre-storage of these parameters is also what allows the invention to be independent of the shape of the scanner work space, thereby allowing motion of the scanner in the work space and parameters such as field of view, resolution, focus, zoom, and magnification to be accounted for even in complex work spaces. Of course, increased complexity in the placement of the range scanner becomes possible as well.

The invention further satisfies the primary and overlap constraints while ensuring that scanning constraint(s) are met. Because the RRs of the scanner 10 are explicitly modeled, the invention can accurately position the range scanner 10 to sample any surface even if it is small or partially hidden. The NBV calculating software is self-terminating and can be instructed to resample poorly sampled surfaces with a higher accuracy. The invention is also easily generalizable to nearly any scanner and setup simply by enclosing the viewing volume with a PSS shaped like a sphere.

Those skilled in the art will appreciate that the present invention is superior to other solutions to the NBV problem in that the overlap constraint requires that the next scanner position chosen re-sample part of the object already scanned so that the resampled portions may be used to align the range images. Without the ability to guarantee resampling, a solution to the NBV problem is practically useless. No other solution to the NBV problem directly addresses the overlap constraint.

In addition, the invention performs off-line one of the most computationally intensive operation performed by a solution to the NBV problem, namely, determining what areas of the viewing volume could be scanned by a range camera from a particular position, orientation, and other sampling parameters. Since range scanners cannot see through an object, it is important to determine that a portion of the viewing volume which should be scanned is not obstructed by some other part of the object. Positional space addresses this computational burden by performing visibility computations only a small fixed number of times for each area of the viewing volume of interest. These expensive operations are not performed for each potential scanner position and so the solution is much more useful and general. Other solutions do not break the computational burden of examining thousands of potential scanner positions.

Moreover, in accordance with the invention, the range scanner can be positioned so as to sample the object's visible surfaces to within a certain tolerance. No other NBV solution addresses this problem. In addition, the technique in accordance with the invention can determine when no more surfaces of the object can be scanned and so is self-terminating. This is a crucial for an automated system. Other solutions to the NBV problem do not address this concern. Finally, the technique of the invention allows $P_c^i$ to be computed off-line and stored for use in the comparison of the RRs and ORs so that the shape of the PSS can be totally independent of the work space of the range scanner and of any shape so long as the PSS encloses the object to be viewed. This independence from the work space is significant for certain applications, such as those calling for the placement of the range scanner on a robotic arm.

Although an exemplary embodiment of the invention has been described in detail above, those skilled in the art will readily appreciate that many additional modifications are possible in the exemplary embodiment without materially departing from the novel teachings and advantages of the invention. Accordingly, these and all such modifications are intended to be included within the scope of this invention as defined in the following claims.

What is claimed is:

1. A method of acquiring a three-dimensional surface image of an object using a range camera, comprising the steps of:

storing in a memory positional space representations of ranging rays generated by a range camera for each camera position in a work space of said range camera at which said range camera may be positioned to scan said object;

scanning the object with the range camera to create a partial surface image of the object including a seen surface and an unseen surface;

determining the next best view position for viewing said unseen surface of the object from a number of possible positions, orientations, and sampling parameters of said range camera by comparing said positional space representations of said ranging rays from certain camera positions stored in said memory with observation rays from seen and unseen surfaces of said object; and scanning the object with the range camera at the determined next best view position and updating said partial surface image to include the image data acquired at the determined next best view position.

2. A method as in claim 1, wherein said step of determining the next best view position comprises the steps of defining void patches on the unseen surface at an edge of the seen surface, computing a representation of the unseen surface in positional space $P_v$ by projecting each observation ray of each void patch into positional space where a value of a cell (w, y) and angles $\theta$ and $\phi$ of each projection in a local coordinate system centered at cell (w, y) in positional space is computed as:

$$P_v(w,y,\theta,\phi) = \begin{cases} \Sigma \overline{o} \|e_T\| c_{\overline{o}} & \forall \overline{o} \sim (w,y,\theta,\phi) \\ 0 & \text{otherwise} \end{cases}$$

where $\overline{o}$ is an observation ray of a void patch, $\|e_T\|$ is the area of a triangle of the object that the void patch is attached to, and $c_{\overline{o}}$ is the confidence of $\overline{o}$, where the confidence of $\overline{o}$ is a function of a surface normal of the void patch and of $\overline{o}$, and computing a representation of the seen surface in positional space as:

$$P_s(w,y,\theta,\phi) = \begin{cases} \Sigma \overline{o} \|T\| c_{\overline{o}} & \forall \overline{o} \sim (w,y,\theta,\phi) \\ 0 & \text{otherwise} \end{cases}$$

where $\overline{o}$ is an observation ray of a triangle T of the object.

3. A method as in claim 2, wherein said step of storing positional space representations of ranging rays generated by the range camera for each camera position in the range camera's work space is performed prior to acquiring any surface data of said object and comprises the step of calculating, for i=1 to n positions in said work space where said range camera may be positioned to scan said object, an image $P_c^i$ in positional space of the range scanner at position i, defined as:

$$P_c^i(w,y,\theta,\phi) = \begin{cases} 1 & \text{if some } RR\, \overline{r} \rightarrow (w,y,\theta,\phi) \\ 0 & \text{otherwise} \end{cases}$$

where r is a ranging ray from the range camera at the position i in the range camera's work space.

4. A method as in claim 2, wherein the unseen surface $P'_v$ includes observation rays of triangles of said object having confidences lower than a predetermined confidence u, where confidence $c_T$ of triangle T of the object is the minimum confidence of the three vertices of triangle T whose confidences are the angle between the ranging ray of the vertex and a normal to triangle T, defined as:

$$P'_v(w,y,\theta,\phi) = \begin{cases} \Sigma \overline{o}_v \|e_T\| c \overline{o}_v & + \forall \overline{o}_v, \overline{o}_s \rightarrow \\ \Sigma \overline{o}_s \|T\|(u - c_T) & (w,y,\theta,\phi) \\ & \text{and } c_T < u \\ 0 & \text{otherwise} \end{cases}$$

where $\overline{o}_s$ is the observation ray of the triangle T of the object, and $\overline{o}_v$ is an observation ray of a void patch attached to the triangle $e_T$.

5. A method as in claim 3, wherein said step of determining the next best view position comprises the step of maximizing an objective function N(i), i=1 to n, defined as:

$$N(i) = o(o_v(i), o_s(i))$$

where $$o_v(i) = \Sigma_w \Sigma_y \Sigma_\theta \Sigma_\phi P_c^i(w,y,\theta,\phi) P_v(w,y,\theta,\phi)$$

$$o_s(i) = \Sigma_w \Sigma_y \Sigma_\theta \Sigma_\phi P_c^i(w,y,\theta,\phi) P_s(w,y,\theta,\phi)$$

and o(v,s) is a function whose parameters represent the amount of unseen surface v and seen surface s visible by the range camera from position i.

6. The method as in claim 5, where:

$$o(v,s) = \begin{cases} v & \text{if } s > t \\ 0 & \text{otherwise} \end{cases}$$

for a threshold t.

7. A method as in claim 1, wherein said storing step further comprises the step of storing sampling parameters including at least one of field of view, resolution, focus, and magnification data for said range camera at each position in the work space of said range camera at which said range camera may be positioned to scan said object.

8. A method as in claim 1, wherein said positional space representation includes a positional space surface of arbitrary geometry which encloses a viewing volume of said object in such a way that every ranging ray from the range camera in any position in the work space of the range camera would intersect said positional space surface.

9. A method as in claim 8, wherein said positional space representation is either a cylindrical or spherical positional space surface which completely surrounds said viewing volume in positional space.

* * * * *